United States Patent [19]
Cidon et al.

[11] Patent Number: 5,579,480
[45] Date of Patent: Nov. 26, 1996

[54] SYSTEM AND METHOD FOR TRAVERSING ATM NETWORKS BASED ON FORWARD AND REVERSE VIRTUAL CONNECTION LABELS

[75] Inventors: Israel Cidon, Palo Alto; Man-Tung T. Hsiao, Fremont, both of Calif.; Raphael Rom, Haifa, Israel; Phanindra Jujjavarapu, Pleasanton, Calif.; Moshe Sidi, Haifa, Israel; Asad Khamisy, Sunnyvale, Calif.

[73] Assignee: Sun Microsystems, Inc., Mountain View, Calif.

[21] Appl. No.: 430,348

[22] Filed: Apr. 28, 1995

[51] Int. Cl.⁶ .................................................. H04L 12/56
[52] U.S. Cl. ................... 395/200.1; 370/60; 370/60.1; 395/200.2; 395/200.11
[58] Field of Search ............................ 395/200.1, 200.2, 395/200.11, 200.12, 200.15, 200.06, 200.02; 370/60, 60.1

[56] References Cited

U.S. PATENT DOCUMENTS

| | | | |
|---|---|---|---|
| 5,268,962 | 12/1993 | Abadi et al. | 380/21 |
| 5,303,302 | 4/1994 | Burrows | 380/49 |
| 5,309,433 | 5/1994 | Cidon et al. | 370/60 |
| 5,379,295 | 1/1995 | Yonehara | 370/60 |
| 5,394,393 | 2/1995 | Brisson et al. | 370/60 |
| 5,440,547 | 8/1995 | Easki et al. | 370/60 |
| 5,459,725 | 10/1995 | Bodner et al. | 370/60 |
| 5,463,621 | 10/1995 | Suzuki | 370/60 |
| 5,483,525 | 1/1996 | Song et al. | 370/60 |
| 5,483,526 | 1/1996 | Ben-Nun et al. | 370/60.1 |
| 5,487,064 | 1/1996 | Galand et al. | 370/60 |
| 5,487,065 | 1/1996 | Acampora et al. | 370/60.1 |
| 5,504,743 | 4/1996 | Drefenstedt | 370/60.1 |
| 5,511,076 | 4/1996 | Ramakrishnam et al. | 395/200.02 |
| 5,526,353 | 6/1996 | Henley et al. | 370/60.1 |

*Primary Examiner*—Christopher B. Shin
*Attorney, Agent, or Firm*—Flehr, Hohbach, Test, Albritton & Herbert

[57] ABSTRACT

In a communication network having a set of hosts and switch based label swapping communication nodes, each node has a control processor that is also a host that sends and receives messages via the switching apparatus in its associated node. Each node's control processor also includes a virtual connection (VC) traversal procedure that implements the methodology of the present invention. The control processor of any node along an established connection can initiate the transmission of a VC traversal message to the control processors of all the nodes along the connection. The VC traversal message is transmitted as one or more ATM cells, where each cell includes a standard ATM header for routing the cell to a neighboring node's control processor, as well as a VC traversal header in the body of the cell that identifies the connection being traversed. When a node receives a VC traversal message with a VC traversal header in it, the virtual connection traversal procedure in the receiving node processes that message by (A) performing whatever command is indicated in the VC traversal header, (B) routing a copy of the VC traversal message to the control processor of each node to which a data cell on the connection being traversed would be sent, and (C) performing a VC traversal header swapping operation on each such copy of the VC traversal message so that the VC traversal header in each forwarded VC traversal message identifies the segment of the connection being traversed by the control message.

21 Claims, 5 Drawing Sheets

PRIOR ART

SYSTEM AND METHOD FOR TRAVERSING ATM NETWORKS BASED ON FORWARD AND REVERSE VIRTUAL CONNECTION LABELS

The present invention relates generally to the class of computer communications networks known as known as switch based label swapping computer networks, the most prevalent example being Asynchronous Transfer Mode computer networks, and more specifically relates to a system and method for efficiently sending messages to the controllers of the network nodes along a previously established connection or partial connection.

BACKGROUND

Figure 1:
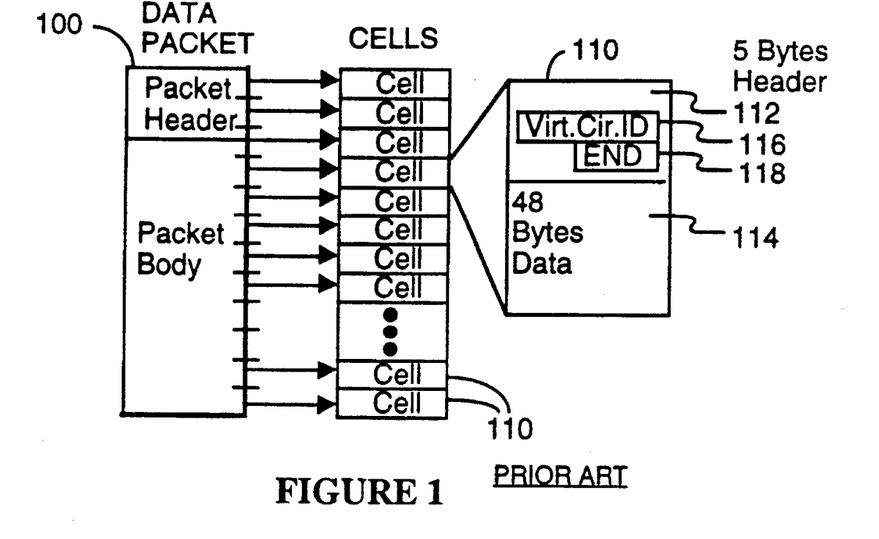
FIG. 1 is a block diagram of a data packet and the corresponding ATM cells into which the packet is fragmented for purposes of transmission over a network.

Modern high speed networks use a new set of standards collectively termed ATM (Asynchronous Transfer Mode). Referring to FIG. 1, in ATM computer networks data packets 100 transmitted over the network are fragmented into smaller cells 110 for transmission over the network. Each cell 110 is 53 bytes long, including a five-byte header 112 and a 48-byte cell payload (i.e., data) 114. Each cell's header 112 includes a "virtual connection identifier" 116, discussed below, and a END flag 118 that is set only for the last cell of each data packet. Data packets that are 48 bytes or less in length are transmitted as single cell (also called unicell) messages.

Figure 2:
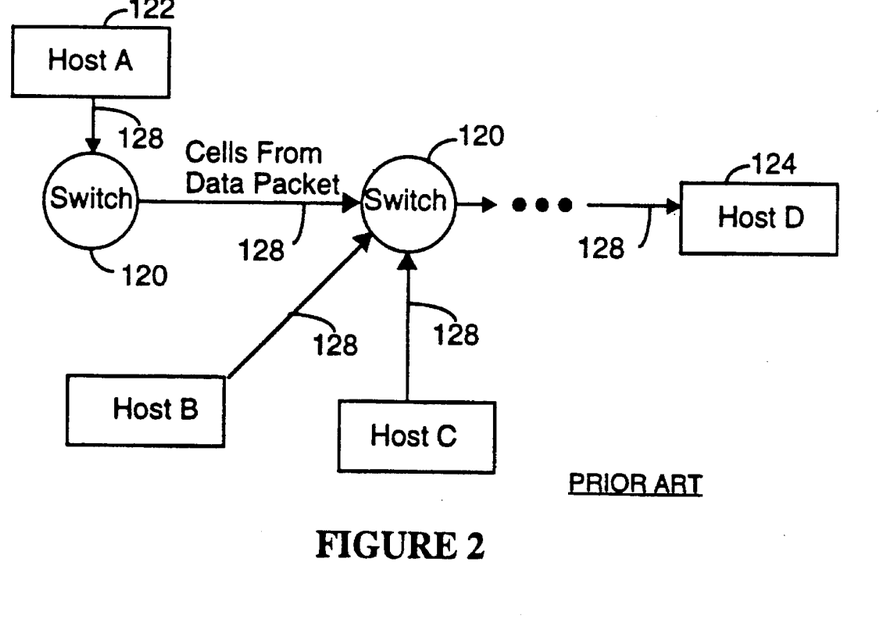
FIG. 2 is a block diagram of a portion of a computer network.

Furthermore, as shown in FIG. 2, the cells of a data packet may need to be routed through a number of switches 120 during transport from a sourcing host computer A 122 to a destination host computer 124.

To allow very high data rates (in the hundreds of Mb/s and above) the switching time of a cell in every switch 120 along the route must be minimal. ATM networks achieve this by means Of a label swapping mechanism which requires a set up phase before the actual data stream can be transported from source to destination.

To support the transfer of data cells in the ATM network, a set of messages is defined for the set up, maintenance, and take down of the labels, bandwidth reservations and the like for each ATM connection. In order to forward these control messages, either the entire route must be supplied with each message, or the message can be forwarded based on the labels already set up for an existing connection. The current invention is aimed at the efficient distribution of the control messages by the use of labels in a given "connection," so that the entire route to be traversed by the message need not be carried in each message.

It is noted that the terms connection, virtual connection and virtual circuit are used interchangeably in this document. More particularly, all three of these terms are defined to mean a communication channel that may include one or more interconnected virtual connection segments. Each virtual connection segment is a data channel or control channel that traverses one link between two neighboring nodes or one link between a host and node, while a connection or virtual connection (VC) is a communication channel that travels through numerous links and their connecting nodes. A "connection" is established or represented by a set of one of more virtual connection indentifiers (VCIs) stored in the VC tables of the nodes along the connection path.

The terms "node" and "switch" are also used interchangeable in this document.

Referring again to FIG. 2, at a high level, ATM networks can be viewed as a collection of A TM-switches 120 interconnected by high-speed links 128 in a networked fashion to provide ATM service to a number of external users 122, 124.

Figure 3:
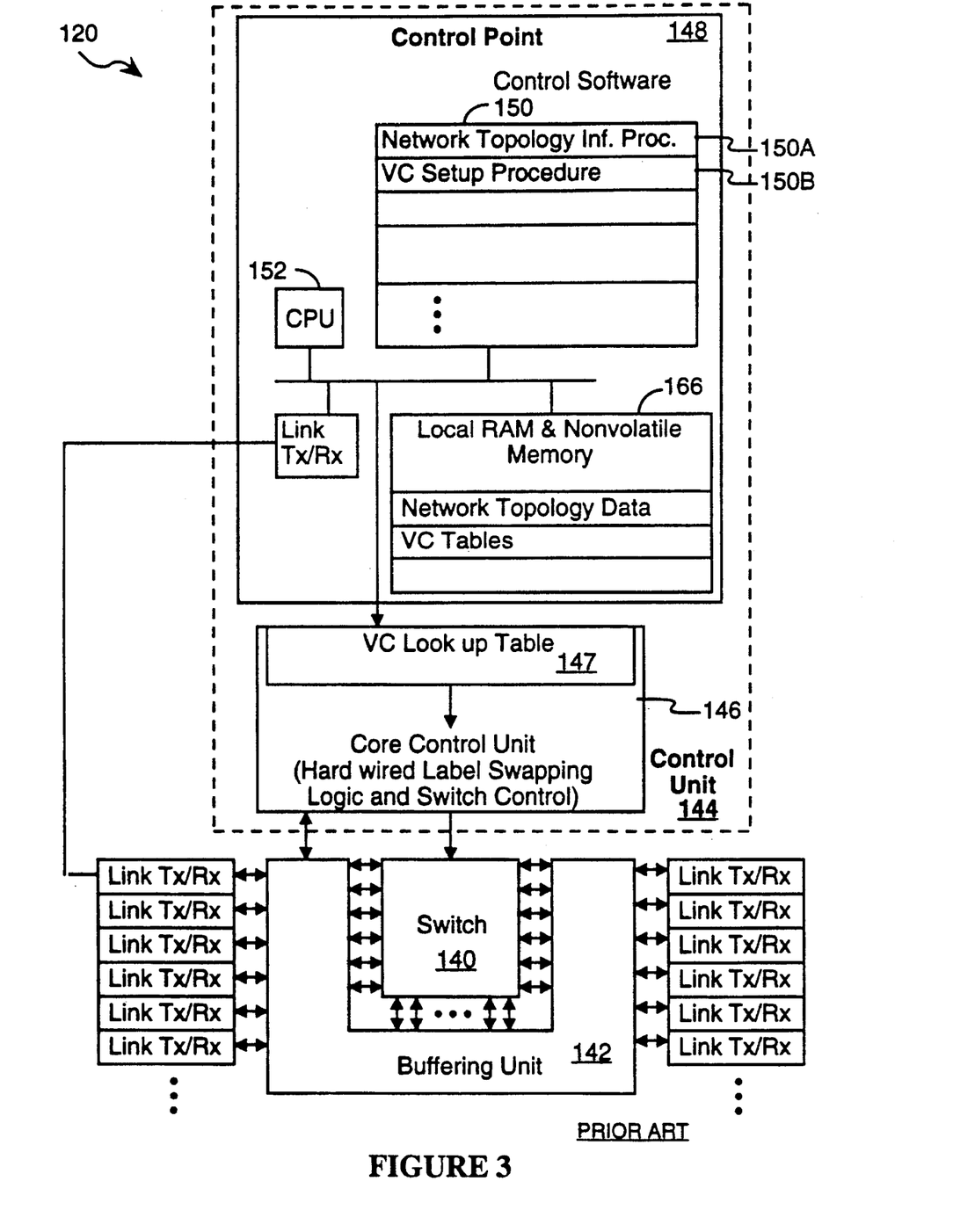
FIG. 3 is a block diagram of a node in an ATM network.

Referring to FIG. 3, a typical switch 120 is comprised of three main parts: the switching fabric 140, a buffering unit 142, and a control unit 144. The control unit 144 is divided into two parts 146, 148. The first part 146 controls the cell switching properties, i.e., it controls and coordinates the operation of the buffering unit and the switching fabric. For performance reasons, the first part 146 of the control unit is typically implemented in hardware such as a VC lookup table 147, finite state machines, and so on. The second part 148 of the control unit is responsible for all other control functions such as preparing and maintaining the switching tables, coordinating activities with other switches and with network management facilities, and serving individual user requests. We refer to this second part of the control unit as the control point (CP) of the switch. In our terminology the switch contains the switching fabric, the buffering unit, and the basic core of the control unit, whereas the switch and the CP together will be referred to as an ATM node (or node, for short). The CP 148 is essentially a logical entity which is typically implemented using control software 150 executing on a general purpose microprocessor 152, although firmware and other software/hardware configurations are also possible. A configuration in which a single CP controls several switches is also possible. For example, if the particular way in which a switch is implemented lends itself to the efficient interconnection of several switches (typically of the same kind) then it would be natural to have this set of switches controlled by a single CP.

The physical device on which the CP is implemented is termed the Controlling Device (CD). The CD may not be a single entity, since pads of the CP can be implemented in different hardware pieces. For example, each link adaptor of a switch could contain a separate micro-controller and possibly an additional central micro-processor could be responsible for the common switch functions. Another implementation option is a single CD that hosts several CPs, each controlling a different switch and possibly communications with each other within the same CD.

Two CPs are called neighbors if they control two switches 120 that are directly connected by a link 128. A CP is a uniquely identifiable entity within the network. That is, it is possible to name a CP as the endpoint of a virtual connection (VC) and switches can identify cells destined to the CP and forward them appropriately. This is the mechanism by which control messages can be exchanged between CPs.

Every switch 120 in the network possesses a unique ID, which is assigned to it at configuration time. This ID, termed the switch ID, is guaranteed to be unique only within the network. Links 128 can have IDs that are local to the switch from which they emanate. This allows the use of shod local link IDs, which is beneficial since local link IDs are frequently used. Therefore, to globally identify a link, some combination of a CP ID, node ID and link ID must be used. Link, switch and CP IDs appear in the messages that are exchanged between CPs and hence it is beneficial to choose as short a descriptor as possible.

In general, CPs perform those functions that are necessary to make a group of switches operate as an integrated network. The process of integration entails understanding of and compensation for the differences between switches of different makes and models. One of the most important functions is that of virtual connection (circuit) management which includes VC set-up, maintenance and VC take down.

To perform these functions properly the CP must maintain information regarding network topology and its level of utilization (e.g., available bandwidth on various links with respect to every class of service). Each control point's control software includes a network topology information maintenance procedure 150A for the purposes of retaining up-to-date network topological information. Topological data typically changes very infrequently while utilization data, as explained above (and by design), changes very frequently.

To achieve their functions, CPs obviously need to communicate with one another either directly or indirectly. The control mechanism typically requires CPs to mostly communicate with neighbor CPs. In many cases a message arriving at a CP may trigger the transmission of another message. For example, if a topological change has occurred in the network, a CP will typically notify other CPs (e.g., its neighbors) of the change; each of the recipients of this message may, in turn, generate new messages to further distribute the information. We define a control link as the channel over which two CPs communicate. The collection of control links must enable every CP to distribute the appropriate data to every other CP. In a typical design, there will be a control link between any two neighboring CPs.

One way of forwarding messages along a desired path within an ATM network is to provide a list of each link to be traversed along the path from source to destination. This method may be referred to as the source route method since the source supplies the entire route to be traversed by the message. A source route message may be used, for instance, to set up an ATM connection along a path specified in the message. In the case where a connection has already been established, the source route message is inefficient since it has to carry a large amount of redundant information.

In ATM networks a tree is typically set up by a VC set up procedure 150B, using set up messages. A set up message is a particular type of source route message. The VC set up procedure 150B sends one or more VC set up messages, and those VC set up messages are routed through the ATM network such that they are received by the CPs of all the nodes in the connection to be established.

SUMMARY OF THE INVENTION

The present invention is a system and method for forwarding control and other information in an ATM network using the VC tables of the CPs that are on the path of an existing ATM virtual connection. By making use of the existing VC tables, the use of source route messages is avoided and the portion of each cell's data region which is occupied by routing "overhead" is reduced.

In summary, the present invention is a system and method for sending commands and/or control data and other information to the controllers of the network nodes along a previously established virtual connection. The invention operates in a communication network having a set of hosts and switch based label swapping communication nodes, where each node has a control processor that is also a host that sends and receives messages via the switching apparatus in its associated node. Each node's control processor also includes a virtual connection traversal procedure that implements the methodology of the present invention.

The control point of a node at the source of an established connection, at one the connection's leaf nodes, or at any node in between, can initiate the transmission of a VC traversal message to the control points of all the nodes along the connection. The VC traversal message is transmitted as one or more ATM cells, where each cell includes a standard ATM header for routing the cell to a neighboring node's control point, as well as a VC traversal header in the body of the cell that identifies the connection being traversed.

When a node receives a VC traversal message with a VC traversal header in it, the virtual connection traversal procedure in the receiving node processes that message by (A) performing whatever command is indicated in the VC traversal header, (B) routing a copy of the VC traversal message to the control point of each node to which a data cell on the connection being traversed would be sent, and (C) performing a VC traversal header swapping operation on each such copy of the VC traversal message so that the VC traversal header in each forwarded VC traversal message identifies the segment of the connection being traversed by the control message.

In the preferred embodiment, the VC traversal header swapping operation and retransmission of the VC traversal message are performed as follows. Each node's control processor maintains a virtual connection table. The virtual connection table stores virtual connection data linking each input data channel segment (as represented by an input port and VC label) for an established virtual connection with one or more output data channel segments (as represented by output ports and VC labels). At each control processor, prior to retransmitting a received VC traversal message, virtual connection traversal procedure reads the virtual connection table to identify the data channel segment or segments linked to the data channel segment identified in the VC traversal header of the received VC traversal message. Then, for each linked data channel segment found in the virtual connection table the procedure performs the VC traversal header swapping operation, in which it replaces the virtual connection traversal header in the received VC traversal message with a replacement VC traversal header that identifies one of the linked data channel segments found in the virtual connection table. In addition, it also identifies a control channel parallel to the identified linked data channel segment. The virtual connection traversal header in each retransmitted virtual connection traversal message identifies the linked data channel segment parallel to the control channel over which the retransmitted virtual connection traversal message is being transmitted.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

The present invention provides for the efficient dissemination of control and other information to the CPs that are on the path of a previously established ATM virtual connection. The methodology of the present invention is herein called the "VC traversal" method. The method of the present invention can be used for traversing a connection even though the connection may only be partially set up. The methodology of the present invention also handles different types of fault/error conditions.

In the VC traversal method of the present invention, a message traverses a path from one CP to another according to the route of a previously established connection. A previously established connection can be traversed in the "forward" direction, which is the same direction as messages transmitted over the connection, or in the "reverse" direction.

For the purposes of this document, the terms "switch" and "node" shall be used interchangeable to refer to a multiport device capable of receiving ATM cells on multiple ports, performing an ATM label swapping operation on each received ATM cell, and routing each received ATM cell to an output port based on the input port and virtual connection identifier of the received ATM cell.

Figure 4:
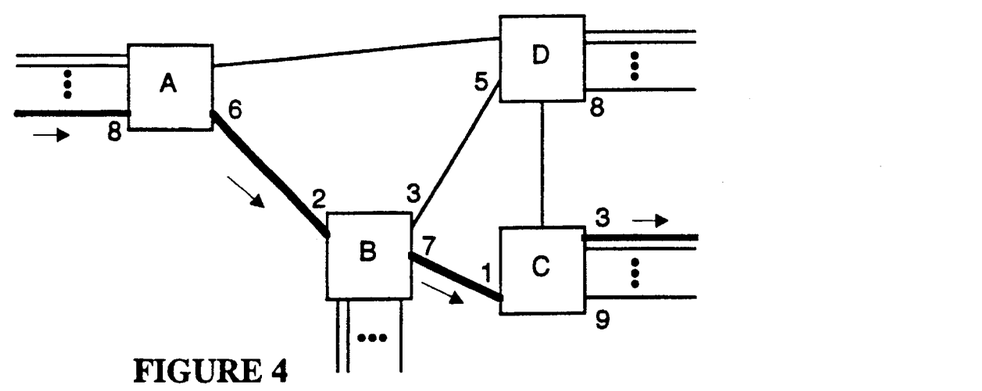
FIG. 4 depicts a set of nodes in an ATM network and a unicast connection path through those nodes.
Figure 5:
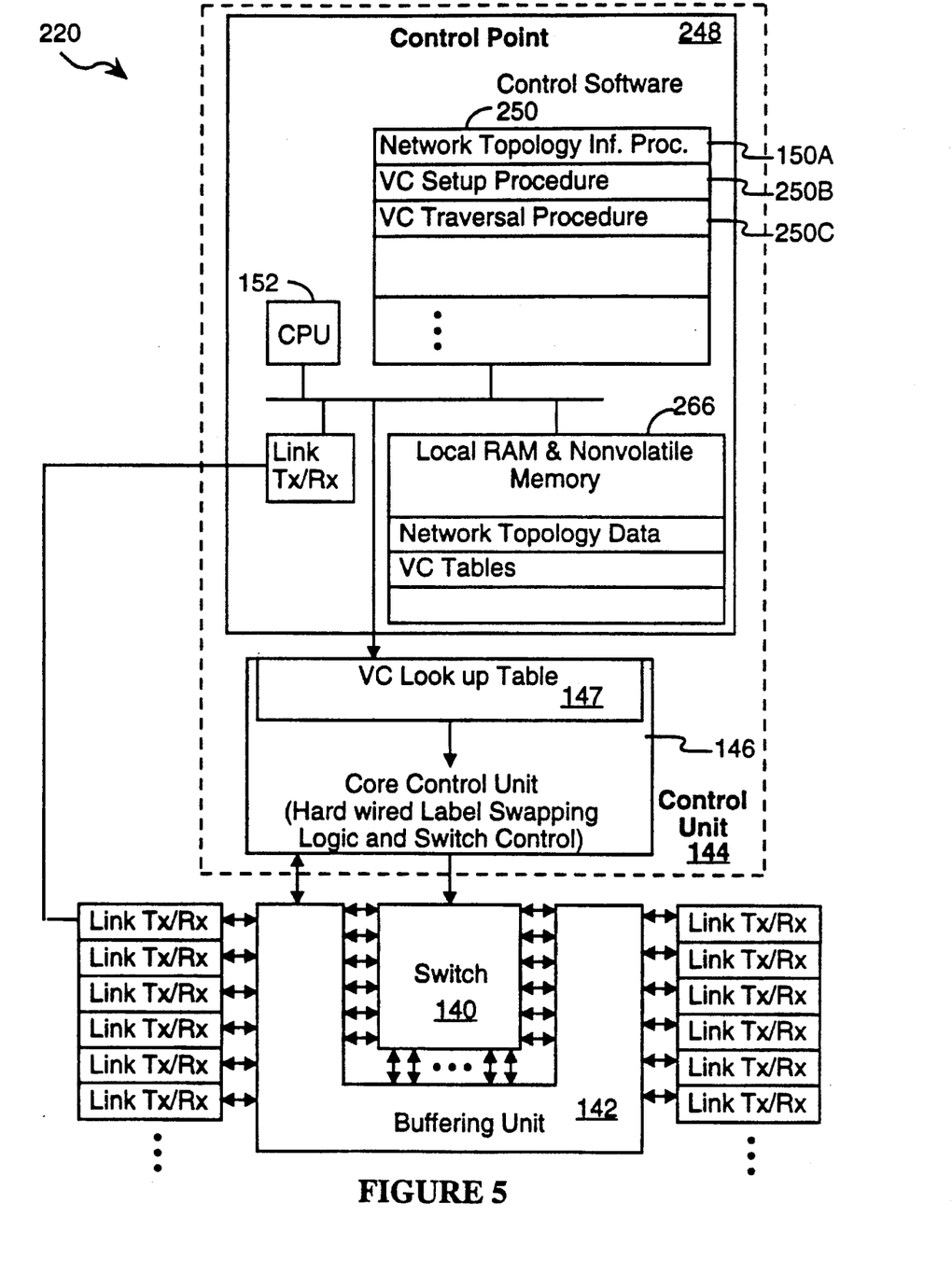
FIG. 5 is a block diagram of a node in an ATM network in accordance with the present invention.

Referring to FIG. 4, from a conceptual viewpoint, each of the links in an ATM network constitutes a communication pathway that is divided into a number of separate channels, herein called channel segments. The main channels of each link are typically used for transmitting data messages between host computers, while other smaller (i.e., lower bandwidth) channels are typically used for sending control messages between the controllers of neighboring nodes. Each of these channels is identified, locally by the neighboring nodes, by a virtual connection identifier (VCI) and by the link IDs assigned to the link by the two nodes at the two ends of the link. The channels used to send data messages are herein called "data channel segments" while the channels used to send control messages are known alternately as "control links," or "control channels." Within each node 220 (FIG. 5), each data channel segment and control channel coupled to that node has a unique (Port ID, VCI) assigned to it by the node's control point 248.

For each of the data channel segments that make up the connection shown in FIG. 4 there is a parallel control channel that uses either the same link as the data channel segment or a parallel link that connects the same two neighboring nodes. All data channel segments going between the same two neighboring nodes share a single control channel for purposes of VC traversal.

The data channel segments and control channels are similar to a highway system for automobiles in which the data channel segments are sections of freeways and highways, while the parallel control channels are the service roads or other local roads that run parallel to the freeway and highway sections. In the present invention, an existing connection is traversed by sending special control messages herein called "VC traversal messages" along the service roads that run parallel to the sequence of freeways sections represented by the connection.

Each cell of a control message has a standard ATM header that causes it to be delivered to the control point of the next node along the route of the connection being traversed. When a control message is a VC traversal message, it also has a "VC traversal header" within the body of the cell. The "VC traversal header" includes data representing some of the header information normally stored in the headers of cells being routed over the connection being traversed. Each node not only performs the standard label swapping operation on received control messages, but also performs a special VC Traversal Label swapping operation in which the VC traversal header in the body of each received control message is swapped or replaced with a new VC traversal header before it is forwarded to a node further down the connection path. The new VC traversal header identifies the port and VCI associated with the segment of the connection that runs parallel to the control channel over which the control message is being transmitted.

In the preferred embodiment, the VC Traversal Label swapping operation is performed under software control using a special "VC Traversal Procedure" 250C in each node's control point 248. The VC Traversal Procedure 250C in each node's control point 248 includes instructions for originating VC traversal messages (188, FIG. 8), as well as instructions for receiving VC traversal messages originated by other nodes, and performing a VC traversal label swapping operation on the received VC traversal messages before retransmitting those messages to other nodes along the virtual connection identified by the VC traversal header in the received VC traversal messages. The VC traversal label swapping operation is performed on the VC traversal header within the body of each control message before it is forwarded to another node's control point, and thus mimics the normal label swapping operation used on data cells routed over the connection being traversed.

VC Traversal Forwarding Mode

Referring to FIG. 4, in the VC traversal forwarding mode, a message traverses a path from one CP to another according to the route of a previously established multi-hop VC. Thus if a VC was established that traverses a sequence of switches, a message using the VC traversal mode will be forwarded from the CP of the first switch in the connection to the CP of a next switch and so on until it reaches the CP of the last switch of the established connection. The VC traversal message itself uses a collection of single hop "control link" VCs which connect each CP over the path to its neighbor. As will be explained in more detail below, when a control message traverses a "cluster" (i.e., two or more nodes that share a single CP) in this mode the message passes through the CP only once and not once per switch.

A VC traversal message can traverse any type of VC, including multicast VCs. VC traversal can also be done in the reverse direction of the VC. This proves useful for recovery functions which arise during connection take down that result from topological changes or other error conditions such as lost messages. In general, a CP 248 stores in its local memory 266 (see FIG. 5) a version of the VC table(s) used by the switch hardware to switch cells from an input port to an output port. An entry in the CP's VC table corresponding to a unicast connection includes at least four fields: input port ID ($P_{in}$), input VC label ($VC_{in}$), output port ID ($P_{out}$) and output VC label ($VC_{out}$). A cell being routed along the connection will enter the switch at port $P_{in}$ with a virtual path identifier (VPI) or virtual connection identifier (VCI), also herein called a VC label, of $VC_{in}$. The cell will then be switched to port $P_{out}$ with a change in the VPI/VCI field to $VC_{out}$. As will be explained in more detail below, CPs exchange VC traversal messages along the same path as the established VC by examining the entries of the VC table and then routing control messages along control channels that are parallel to the established data channel segments.

VC Traversal for Unicast Connections

To forward a VC traversal message along the path of a given unicast connection, a CP needs to include in the forwarded VC traversal message the input VC label (i.e., VCI) of the connection for the node downstream along the path. To be more concrete, consider the node configuration in FIG. 4. A unicast connection has been set up and the path is indicated by the bold lines representing the actual links traversed by cells belonging to this connection.

Portions of the VC tables kept by the CPs of nodes B and C are shown in Table 1 and Table 2, respectively.

TABLE 1

Example of VC table at switch B - unicast connections

| $P_{in}$ | $VCI_{in}$ | $P_{out}$ | $VCI_{out}$ |
|---|---|---|---|
| 2 | 128 | 7 | 32 |
| 2 | 68 | 3 | 83 |
| 5 | 119 | 11 | 55 |
| 5 | 68 | 4 | 23 |
| 7 | 105 | 2 | 89 |
| 2 | 20 | 0 | 19 |
| 0 | 21 | 7 | 20 |
| 7 | 20 | 0 | 24 |
| 0 | 25 | 2 | 20 |

TABLE 2

Example of VC table at switch C - unicast connections

| $P_{in}$ | $VCI_{in}$ | $P_{out}$ | $VCI_{out}$ |
|---|---|---|---|
| 1 | 32 | 3 | 50 |
| 4 | 22 | 6 | 38 |
| 3 | 91 | 1 | 105 |
| 1 | 20 | 0 | 21 |
| 0 | 18 | 3 | 20 |
| 3 | 20 | 0 | 24 |
| 0 | 25 | 1 | 20 |

The first rows of each of the VC tables (which are also bolded) represent the connection in the direction shown by the arrows in FIG. 4. The other rows of the VC tables above the thick line in each table represent other VC connections not used in this example.

The rows of each of the VC tables below the thick line represent the "control link" or control connection between the CPs of neighboring nodes. Note that the assignment of port numbers is done locally and arbitrarily. By convention the local CP is always designated as port 0 (not shown in the Figures). Also, for simplicity, in the examples in this document all inbound VC traversal messages (i.e., messages to be sent to the CP of the receiving node) are assigned a VCI of 20, and each such inbound message is label swapped before delivery to the CP of the receiving node with a unique VCI so that the receiving CP can identify the link on which the control message was received. The rows of the VC tables for VC traversal messages include, in sequence (in this example), rows for 1) control messages received from the preceding CP along the path being traversed, 2) control messages from the local CP to be sent to the next CP along the path being traversed, 3) control messages from the next CP along the path being traversed in the reverse direction, and 4) control messages from the local CP to be sent to the preceding CP along the path being traversed in the reverse direction.

Figure 6:
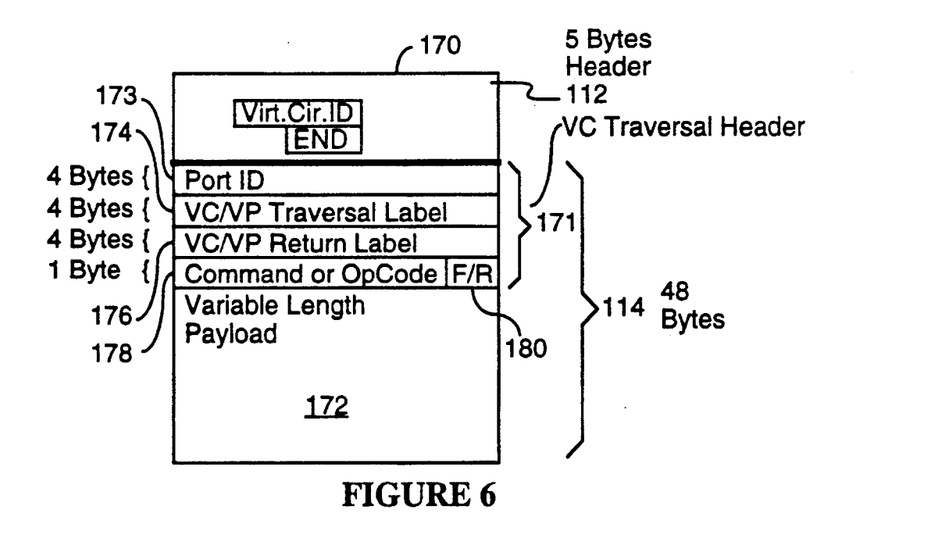
FIG. 6 depicts a VC traversal message for communicating control information or other data or a command to the control processors the nodes along a previously established connection.

Referring to the cell map diagram in FIG. 6, each first cell 170 of a VC traversal message includes a standard 5-byte header 112. The body of the first cell 170 of the traversal message includes a 13-byte VC traversal header 171, followed by up to 35 bytes of "payload" data 172, the contents of which vary depending on the type of VC traversal message being sent. The VC traversal header 171 at the beginning of the VC traversal message includes: a Port ID 173, a VC/VP Traversal Label 174, a VC/VP Return Label 176, and a Command or OpCode 178. The Command 178 includes a forward/reverse indicator or flag 180 that indicates whether the VC traversal message is a forward VC traversal message or a reverse VC traversal message.

A VC traversal message requiring more than 35 bytes of payload data is handled by transmitting a sequence of 53-byte cells that collectively hold the payload data for the VC traversal message. The VC traversal header 171 is included in only the first cell of each VC traversal message.

In the preferred embodiment, for forward VC traversal messages, the Port ID field 173 contains the output port number of the transmitting node associated with the data channel segment being traversed by the message. For reverse VC traversal messages, the Port ID field 173 in the preferred embodiment contains the input port number of the transmitting node associated with the data channel segment being traversed by the message.

In practice, the Port ID represented in the VC traversal message is often the same as the port number that is used to send the VC traversal message. However, when there are two or more parallel links between neighboring nodes, the port used to transmit a VC traversal message may differ from that of the connection segment being traversed by that VC traversal message.

In an alternate embodiment, for forward VC traversal messages the Port ID field 173 represents the input port number of the receiving node for the data channel segment being traversed by the message, if that information is available to the sending node (from topology data collected the network topology information procedure 150A); and for reverse VC traversal messages, the Port ID field 173 contains the output port number of the receiving node for the data channel segment being traversed by the message, if that information is available to the sending node. Regardless of which Port ID convention is used, it is necessary that all nodes use the same Port ID convention. For the remainder of this document, it will be assumed that the Port ID for forward VC traversal messages represents the output port number of the data channel segment being traversed and that the Port ID for reverse VC traversal messages represents the input port number of the data channel segment being traversed.

For forward VC traversal, the VC/VP Traversal Label 174 contains the output VCI of the corresponding VC at the node that is sending the VC traversal message. For reverse VC traversal, the VC/VP Traversal Label 174 contains the input VC label for the VC that is being traversed in reverse.

The VC/VP Return Label 176 contains the VCI associated with the VC in the opposite direction of a bi-directional connection. For unidirectional connections, this field is set equal to −1.

The Command or OpCode field 178 indicates the type of VC traversal message being sent, and thus indicates what action the receiving CP should take upon receipt of the traversal message and what use should be made of the traversal message's payload data 172, if any. Examples of the commands in VC traversal messages are: 1) change VC bandwidth (i.e., to a new specified bandwidth), and 2) VC maintenance commands such as commands for refreshing VCI entries and bandwidth reservations and commands for releasing VCI entries and bandwidth reservations.

Figure 8:
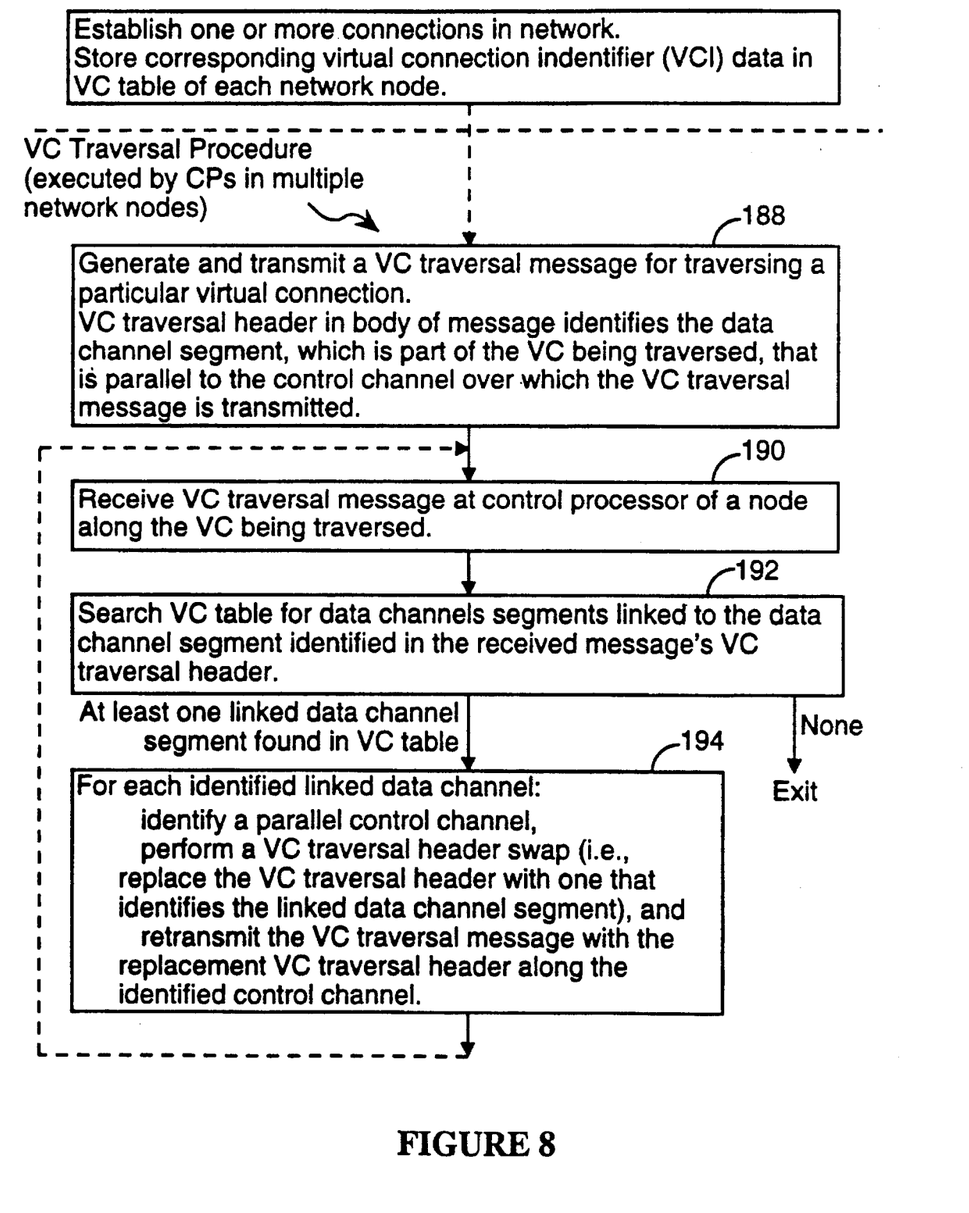
FIG. 8 depicts a flow chart of the preferred embodiment of the virtual connection traversal procedure used in the preferred embodiment of the present invention.

Referring to FIGS. 4 and 8, and Tables 1 and 2, in the VC traversal forward mode, if the CP of node B wishes to forward a VC traversal message to the next CP along the path of this connection, it creates a VC traversal message with a VC Traversal Label field 174 containing the output label $VCI_{out}$ (32 in this case, as shown in the first row of Table 1) of its own table corresponding to this connection. In cases where multiple links may connect two switches, it is also necessary for the VC traversal message to include a Port ID field 173 containing either the output port $P_{out}$ (7 in this case) at switch B or the input port $P_{in}$ at switch C (1 in this case). The Port ID field 173 identifies the actual port the VC runs on in case there are more than one link between two switches and the traversal message is forwarded in a different link from the one used by the VC. In summary, referring to Table 1 and FIG. 4, each VC traversal message sent by node B to node C is sent on port 7 with a VCI of 20, a Port ID field 173 equal to 7 and a VC/VP Traversal Label of 32. The VC/VP Return Label is equal to −1 since the connection being traversed is not bidirectional, and the Command Code 178 can be any command code recognized by the VC traversal procedure 150C.

Note that the network topology information stored by each CP in its local memory 166 includes the port number at the neighbor switch associated with each of its local ports. The following description assumes that the output port of the sending node is used in the Port ID field 173. The control message sent by switch B is forwarded to the CP of switch C via output port 7 using a separate VCI (equal to 20 in Table 1) that connects the CP of switch B to the CP of switch C. When the CP of switch C receives this message, it identifies output port 7 (as identified by the Port ID field 173 of the received message) of node B with input port 1 of node C. It then looks at its own VC table for input port 1 and locates input label (VCI) 32. From this entry, the CP of switch C determines that the message is to be forwarded via output port 3 with VC/VP Traversal Label equal to 50. Thus, node C's CP creates a VC traversal message 170 with a VC/VP Traversal Label equal to 50 and a Port ID field equal to 3, and forward that message in the signalling channel (VCI equal to 20) of port 3. This process continues until the desired destination is reached.

More generally, referring to FIG. 8, when the CP of a node receives a VC traversal message (190) it performs, under the control of the VC traversal procedure 150C, the following sequence of steps. First, the CP searches its VC table for data channel segments that are linked to the data channel segment identified in the VC traversal header 171 of the received message (192). If at least one linked data channel segment is found, a second step (194) is performed for each such linked data channel segment. In particular, for each identified linked data channel segment the CP (A) identifies a parallel control channel, (B) performs a VC traversal header swapping operation in which the VC traversal header in the received message is replaced with a VC traversal header that identifies the linked data channel segment, and (C) transmits the VC traversal message with the replacement VC traversal header along the identified control channel to the CP of a neighboring node.

When a cluster of nodes are controlled by a single CP, a VC traversal message may "skip" one or more hops along the VC being traversed, since there is no point having the cluster's CP send messages to itself. Rather, when a VC traversal message is received by any node in a cluster, the CP searches not only the VC table of the receiving node, but the VC tables of any other nodes in the cluster which are included in the path of the connection being traversed. From those VC tables the cluster's CP determines all the VC traversal messages, if any, which must be transmitted to nodes outside the cluster, performs the VC traversal header swap operation for each such message to be transmitted, and then transmits the revised VC traversal message from the node coupled to the control channel through which that VC traversal message is to be transmitted. This methodology is also used for clusters in multicast VC traversal.

The method of forwarding control messages from a CP to a CP along the path of an existing VC described above is referred to in this document as the Forward VC Traversal or simply VC Traversal. In certain situations, it is useful to forward control messages from CP to CP in the reverse direction of an established VC. This method of traversal is referred to in this document as the Reverse VC Traversal.

Reverse VC Traversal Mode

In the reverse VC traversal mode, a CP forwards in the reverse direction of a given VC a message with the VC/VP Traversal Label field 174 containing the input label $VCI_{in}$ and the Port ID field 173 containing input port $P_{in}$. The last row above the solid line in each of the VC tables (Tables 1 and 2) above represents a VC in the opposite direction from that shown by the arrows in FIG. 4.

When traversing the VC that goes in the opposite direction from that shown in FIG. 4, the CP of switch A sends and the CP of switch B receives on port 2 a reverse VC traversal message with the VC/VP Traversal Label field of 89 and Port ID indicating an input port field equal to 6. The CP of the receiving switch B identifies the Port ID of 6 of switch A with output port 2 at switch B from network topology information stored locally by switch B. Upon receiving this message, switch B will search through its table and attempt to locate the pair (2,89) in the ($P_{out}$, $VCI_{out}$) columns. If the CP maintains a duplicate table sorted by the output port and labels, then the connection procedure 150C searches through that table to locate the (2,89) pair in that table. The CP of switch B then creates a reverse VC traversal message with a Port ID of 7 and a VC/VP Traversal Label of 105 forwards it to C via port 7 with a VCI of 20. The CP of switch C, upon receiving this message from its input port 1, then searches its own VC table and locates the pair (1,105) from the output columns. From that table entry, it creates a reverse VC traversal message with the VC/VP Traversal Label of 91 and a Port ID of 3 and forward that message via output port 3 with a VCI of 20, and so forth.

The reverse VC traversal method generally is less efficient than the forward VC traversal method since a search through an unsorted table may be necessary. Maintaining a duplicate table with sorted output entries solves that problem, but takes more storage and overhead. However, the reverse VC traversal method may be necessary to forward control messages along a uni-directional connection or a partially established bi-directional connection.

VC Traversal for Multicast Connections

A VC traversal message can traverse the tree of a multicast connection in a manner similar to traversing the path of a unicast connection. To forward a VC traversal message along the path of a multicast connection in a separate channel, a CP needs only to include the connection's output VC label (in the VC/VP Traversal Label 174) and the local output port number (in the Port ID field 173), as in the unicast case. The port information is needed in case more than one link may connect a switch pair. As before, the input port of the neighbor switch can be used instead; however, by convention, the output port of the sending node is used as the Port ID in VC forward traversal messages.

The difference here is that each entry in the VC table of the CP may refer to more than one output port/label pair, depending on the structure of the tree. To be more concrete, consider the node configuration shown in FIG. 7. A multicast connection has been set up (from root to leaves) and the path is indicated by the bolded lines representing the actual links traversed by cells belonging to this VC. The arrows indicate the direction of traversal of the message.

Figure 7:
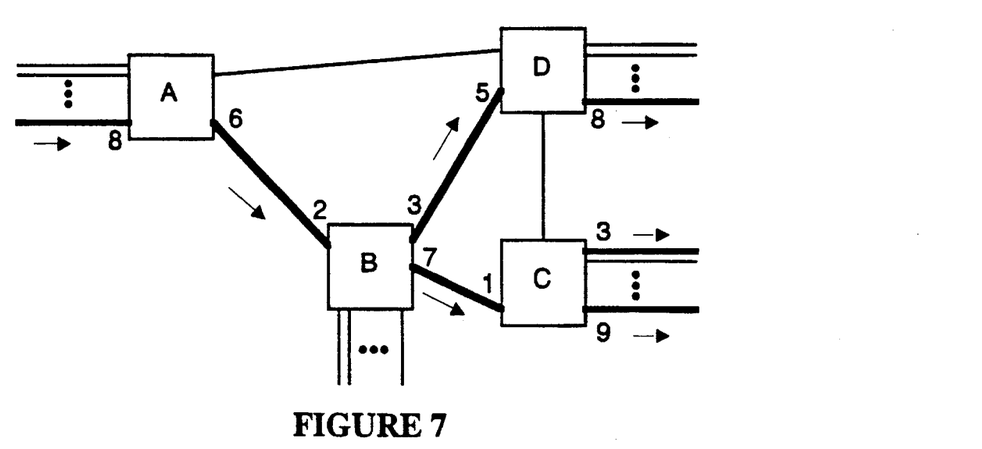
FIG. 7 depicts set of nodes in an ATM network and a multicast connection path through those nodes.

Selected entries in the VC tables for switches B, C and D for implementing the connection path shown in FIG. 7 as well as the VCI for the traversal messages, are shown in Table 3, Table 4 and Table 5, respectively.

TABLE 3

Example of VC table at switch B - multicast connections

| $P_{in}$ | $VCl_{in}$ | $P_{out}$ | $VCl_{out}$ | $P_{out}$ | $VCl_{out}$ |
|---|---|---|---|---|---|
| 2 | 128 | 7 | 32 | 3 | 35 |
| 2 | 68 | 3 | 83 | 8 | 28 |
| 5 | 119 | 11 | 55 | 4 | 42 |
| 3 | 1068 | 2 | 1023 | — | — |
| 7 | 1105 | 2 | 1023 | — | — |
| 2 | 20 | 0 | 19 | — | — |
| 0 | 21 | 7 | 20 | — | — |
| 0 | 23 | 3 | 20 | — | — |
| 7 | 20 | 0 | 24 | — | — |
| 0 | 19 | 2 | 20 | — | — |
| 3 | 20 | 0 | 25 | — | — |

TABLE 4

Example of VC table at switch C - multicast connections

| $P_{in}$ | $VCl_{in}$ | $P_{out}$ | $VCl_{out}$ | $P_{out}$ | $VCl_{out}$ |
|---|---|---|---|---|---|
| 1 | 32 | 3 | 50 | 9 | 77 |
| 4 | 22 | 6 | 38 | 7 | 64 |
| 3 | 1091 | 1 | 1105 | — | — |
| 9 | 1128 | 1 | 1105 | — | — |
| 1 | 20 | 0 | 21 | — | — |
| 0 | 18 | 3 | 20 | — | — |
| 0 | 23 | 9 | 20 | — | — |
| 9 | 20 | 0 | 24 | — | — |
| 0 | 19 | 1 | 20 | — | — |
| 3 | 20 | 0 | 25 | — | — |

TABLE 5

Example of VC table at switch D - multicast connections

| $P_{in}$ | $VCl_{in}$ | $P_{out}$ | $VCl_{out}$ |
|---|---|---|---|
| 5 | 35 | 8 | 50 |
| 6 | 53 | 3 | 36 |
| 8 | 1018 | 5 | 1068 |
| 5 | 20 | 0 | 21 |

TABLE 5-continued

Example of VC table at switch D - multicast connections

| $P_{in}$ | $VCl_{in}$ | $P_{out}$ | $VCl_{out}$ |
|---|---|---|---|
| 0 | 18 | 8 | 20 |
| 8 | 20 | 0 | 21 |
| 0 | 19 | 5 | 20 |

The bolded rows in the VC tables represent the multicast connection in the direction shown by the arrows in FIG. 7.

In the Multicast Forward VC Traversal, a CP forwards a control message to all downstream CPs by locating an entry in its VC table matching the label (i.e., the VC Traversal Label 174) in the VC traversal message it receives from a previous CP. For example, suppose that the CP of switch B receives a VC traversal message at port 2 with a VC Traversal Label of 128 and a Port ID of 6. The VC Traversal Procedure 150C in the CP of node B responds to receipt of that VC traversal message by creating two messages with different VC Traversal Labels and Port ID fields. The first message will be sent via port 7 with VC Traversal Label and Port ID fields of 32 and 7, respectively. Similarly, the second message will be sent via port 3 with VC Traversal Label and Port ID fields of 35 and 3, respectively.

Referring to Table 3, it is noted here that when Node B's CP transmits the two VC traversal messages, they are initially sent via port 0 to the switching fabric of Node B with VCI's of 21 and 23, respectively, and that the normal label swapping mechanism of the node's controller outputs these two messages with replacement headers as indicated above and by the following data structure listings:

Traversal Message Received by Node B
    Input Port=2
    Header
        VCI=20
    Body
        Port ID=6
        VC Traversal Label=128

First Traversal Message Generated and Sent by Node B
    Output Port=7
    Header:
        VCI=20
    Body
        Port ID=7
        VC Traversal Label=32

Second Traversal Message Generated and Sent by Node B
    Output Port=3
    Header:
        VCI=20
    Body
        Port ID=3
        VC Traversal Label=53

The CP at switch C receives the VC traversal message at port I and looks up the VC Traversal Label in the received message its own VC table. It also forwards two messages, one via port 3 with label 50 and port 3, and the other via port 9 with label 77 and port 9. On the other hand, the CP of switch D receives B's VC traversal message at port 5 and forwards that message via port 8 with label 50 and port 8. This process continues until the message arrives at a leaf node of the previously established connection.

It is also possible to use the forward VC traversal mode to send control messages from a leaf node back to the root for an established source tree. Basically, a source tree consists of a number of source hosts (the leaves) and a single destination node (the root) where cells are directed from the leaves to the source. The source tree is useful for many maintenance functions of multicast connections. The forwarding of messages along a source tree from a single leaf to the root using forward VC traversal is identical to the unicast VC traversal methodology described above.

In Multicast Reverse VC Traversal, the CP forwards messages in the reverse direction of either a multicast tree or a source tree. As an example, consider the reverse traversal of a source tree. The rows in the VC tables 3, 4 and 5 below the double line represent parts of a source tree. Control messages (i.e., VC traversal messages) are to be forwarded in the direction shown by the arrows in FIG. 7, which is the reverse direction of the source tree. As explained above, in the preferred embodiment the VC traversal header 171 in reverse VC traversal messages contains data representing the VCI of the data channel segment being traversed and the associated input port of the switch sending the VC traversal message.

In this case, the CP of node B will receive on port 2 a reverse VC traversal message from node A with a VC Traversal Label containing the label 1023 and a Port ID of 6. Node B will then search through its VC table locating all occurrences of the pair (2,1023) in the output fields. There are two rows in the table matching this search and thus it forwards two messages: a first VC traversal message is sent via node B's port 3 to the CP of node D with a VC Traversal Label of 1068 and a Port ID field of 3, and a second VC traversal message is sent via node B's port 7 to the CP of switch C with a VC Traversal Label of 1105 and a Port ID field of 7.

The CP of switch C in turn locates two entries matching the "Port, VCI" pair (1,1105) in its own VC table and forwards two messages: one VC traversal message is sent via node C's port 3 with a VC Traversal Label of 1091 and a Port ID of 3, and a second VC traversal message is sent via node C's port 9 with a VC Traversal Label of 1128 and a Port ID of 9. The CP of switch D also receives a VC traversal message from B and locates a single corresponding entry (5,1068) in its VC table and forwards a VC traversal message with a VC Traversal Label of 1018 and a Port ID of 8 via node D's port 8. The VC traversal process continues until the message arrives at a leaf node.

The reverse VC traversal of a multicast tree is similar to the reverse traversal of a unicast connection and is therefore not repeated.

For multicast reverse VC traversal, it is necessary to search for multiple occurrences of "output port, VC label (VCI)" pairs in the control point's locally stored version of the VC table. As a result the entire locally stored version of the VC table must be searched to determine if all occurrences have been found. For instance, when performing a reverse VC traversal of the source tree corresponding to the set of data connections going in the opposite direction from the ones shown in FIG. 7, node B's control point would need to search its locally stored version of the VC table for all occurrences of (2,1023) as (Port ID, VCI) output entries, determine the set of corresponding (Port ID, VCI) input entries, and then would forward copies of the VC traversal message on control channels parallel to the data channel segments identified by those input entries. In this situation, maintaining in the control point's local memory a duplicate table with entries sorted by output port/label may be justified and is therefore used in the preferred embodiment of the present invention in systems that employ multicast reverse VC traversal.

The forward and reverse VC traversal methods described above rely on the existence of a uni-directional connection only. If a bi-directional unicast connection is available, then the message forwarding along any direction can be done in either the forward or reverse traversal mode. A multicast connection can be uni-directional or bi-directional in general. If a bi-directional multicast connection exists, then the VC traversal can also be performed in either forward or reverse directions. In the preferred embodiment, the forward VC traversal mode is used whenever possible, because it is more efficient. However, the reverse traversal may be the only possible way to traverse a connection under some exception conditions, such as a partially set up or partially released connection. In the case of a uni-directional multicast connection, it is possible to maintain a set of reverse direction logical labels (a logical source tree).

Handling of Transient Conditions under VC traversal

With proper design, VC traversal can be used on connections that are not complete, as in some transient conditions such as partially established or partially taken down connections. Since the ATM forum UNI 3.0 specifies bi-directional unicast and uni-directional multicast connections, we describe the handling of transient conditions for both of these types of connections here. The VC traversal mode of forwarding control messages to CPs along the path of a given unicast connection or the tree of a multicast connection works well on any established VCs, where all the labels are in place for either direction. Logical labels are preferably maintained by the CP in its local memory (i.e., not in the hardware VC lookup table) for the reverse direction in the case of a uni-directional multicast connection. However, it is possible to use the VC traversal forwarding mode even when a VC has not been completely established or when the VC has been partially taken down.

To support error recovery during connection establishment, connection maintenance and connection take down, a combination of forward and reverse VC traversal may be used. In general, the forward VC traversal method is used whenever labels (i.e., established VC table entries) are available for forward traversal. The reverse VC traversal is used whenever it is not possible to use the forward traversal mode of operation. In the preferred embodiment, the VC traversal procedure, upon receiving a reverse VC traversal message, determines if it is possible to continue the operation requested in the received message with a forward VC traversal mode message instead of a reverse VC traversal message, and if so it then generates and sends a forward VC traversal message. The VC traversal procedure 250C in each node's CP 248 always responds to receiving a forward VC traversal message by performing the action associated with the Command 178 in the received VC traversal message and forwarding the VC traversal message to the next node(s) along the connection being traversed, unless the receiving node is a leaf node (i.e., the last node in the connection that is being traversed).

Handling of Exception Conditions Under VC Traversal

If a CP receives a VC traversal message but the VC traversal procedure 150C of the receiving CP is unable to locate the appropriate VC label and port in its VC table, an exception condition is said to have occurred. There may be error scenarios which lead to exception conditions in the use of VC traversal. Under exception conditions, it is not possible to proceed any further with either the forward or the reverse VC traversal. In this circumstance, the VC traversal procedure aborts the forwarding of messages and initiates a release procedure in the opposite direction of traversal to relinquish the resources associated with the VC involved. In other words, the release procedure creates a new VC traversal message whose command 178 instructs the receiving CPs to release the channel and bandwidth reservations associated with the VC being released.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A switch based label swapping communication network, comprising:

a set of interconnected hosts and switch based label swapping communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

said network including at least one a virtual connection between hosts coupled to distinct ones of said nodes in said network, said virtual connection including a tree of data channel segments on a plurality of said links that interconnect a tree of said nodes in said network;

each of said control processors at said tree of said nodes including a message generation procedure, executed by each of said control processors, for generating a virtual connection traversal message that includes (1) a message header having an input label that identifies a first control channel connecting said control processor to the control processor another one of said nodes, and (2) a data portion that identifies a data channel segment in one of said virtual connections;

each of said control processors at said tree of said nodes further including a virtual connection traversal procedure, executed by each of said control processors, for collectively transmitting said virtual connection traversal message over a sequence of control channels to the control processors at a sequence of nodes along said virtual connection, wherein each of said control channels is topologically parallel to one of the data channel segments in said one virtual connection; and each of said control processors including a communication port for sending and receiving messages including said virtual connection traversal message; and said virtual connection traversal procedure including instructions for parsing said virtual connection traversal header in each virtual connection traversal message received by the control processors executing said virtual connection traversal procedure to identify a next data channel segment, if any, along said virtual connection and to identify a control channel topologically parallel to said identified next data channel segment, and for then retransmitting said received virtual connection traversal message along said identified control channel to the control processor of a next node along said virtual connection.

2. The computer communications network of claim 1, said virtual connection traversal header including a command;

said virtual connection traversal procedure including instructions for executing said command in said received virtual connection traversal message.

3. The computer communications network of claim 1, each of said control processors at said tree of said nodes including a local memory storing virtual connection data linking a first data channel segment in said tree of data channel segments with one or more second data channel segments in said tree of data channel segments;

said virtual connection traversal procedure including instructions for (1) accessing said stored virtual connection data, prior to retransmitting said virtual connection traversal message, to identify each data channel segment linked to the data channel segment identified in the data portion of said received virtual connection traversal message, (2) for each identified linked data channel segment, modifying said data portion of said virtual connection traversal message so as to include data that identifies said linked data channel segment, and (3) for each identified linked data channel segment, identifying a control channel that is topologically parallel to said identified linked data channel segment; and then (4) for each identified linked data channel segment, retransmitting said virtual connection traversal message over said identified control channel such that the virtual connection traversal header in each retransmitted virtual connection traversal message identifies the linked data channel segment topologically parallel to the control channel over which said retransmitted virtual connection traversal message is being transmitted.

4. The computer communications network of claim 1, wherein said data channel segment identified in said data portion of said virtual connection traversal message is represented in said data portion by an input label associated with an input link of the node that receives said virtual connection traversal message; and said tree of nodes to which said virtual connection traversal message is transmitted follows, in order, nodes traversed by messages transmitted over said one virtual connection.

5. The computer communications network of claim 4, each of said control processors at said tree of said nodes including a local memory storing virtual connection data linking a first data channel segment in said tree of data channel segments with one or more second data channel segments in said tree of data channel segments;

said virtual connection traversal procedure including instructions for (1) accessing said stored virtual connection data, prior to retransmitting said virtual connection traversal message, to identify each data channel segment linked to the data channel segment associated with the input link representing in the data portion of said received virtual connection traversal message, (2) for each identified linked data channel segment, modifying said data portion of said virtual connection traversal message so as to include an output label associated with said linked data channel segment, and (3) for each identified linked data channel segment, identifying a control channel that is topologically parallel to said identified linked data channel segment; and then (4) for each identified linked data channel segment, retransmitting said virtual connection traversal message over said identified control channel such that the virtual connection traversal header in each retransmitted virtual connection traversal message identifies the linked data channel segment topologically parallel to the control channel over which said retransmitted virtual connection traversal message is being transmitted.

6. The computer communications network of claim 1, wherein said data channel segment identified in said data portion of said virtual connection traversal message is represented in said data portion by an output label associated with an output link of the node that receives said virtual connection traversal message; and said tree of nodes to which said virtual connection traversal message is transmitted follows, in order, nodes traversed by messages transmitted over said one virtual connection.

7. The computer communications network of claim 6, each of said control processors at said tree of said nodes including a local memory storing virtual connection data linking a first data channel segment in said tree of data channel segments with one or more second data channel segments in said tree of data channel segments;

said virtual connection traversal procedure including instructions for (1) accessing said stored virtual connection data, prior to retransmitting said virtual connection traversal message, to identify each data channel segment linked to the data channel segment associated with the output link representing in the data portion of said received virtual connection traversal message, (2) for each identified linked data channel segment, modifying said data portion of said virtual connection traversal message so as to include an input label associated with said linked data channel segment, and (3) for each identified linked data channel segment, identifying a control channel that is topologically parallel to said identified linked data channel segment; and then (4) for each identified linked data channel segment, retransmitting said virtual connection traversal message over said identified control channel such that the virtual connection traversal header in each retransmitted virtual connection traversal message identifies the linked data channel segment topologically parallel to the control channel over which said retransmitted virtual connection traversal message is being transmitted.

8. A method of sending messages in a switch based label swapping communication network of hosts and communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

said network including at least one a multicast virtual connection between a source host and a tree of destination hosts in said network, said virtual connection including a tree of interconnected data channel segments on a plurality of said links that interconnect a tree of said nodes in said network;

said method comprising the steps of:

(A) at the control processor of one of said nodes,, generating a virtual connection traversal message that includes (1) a message header having an input label that identifies a first control channel connecting said control processor to the control processor another one of said nodes, and (2) a data portion that identifies a data channel segment in one of said virtual connections;

(B) transmitting said virtual connection traversal message over a tree of control channels to the control processors at a tree of nodes along said virtual connection, wherein each of said control channels is topologically parallel to one of the data channel segments in said one virtual connection; and (C) at each of said control processors in said sequence of nodes, receiving said virtual connection traversal message, parsing said data portion of said virtual connection traversal message to identify one or more next data channel segments, if any, along said virtual connection and to identify a control channel topologically parallel to each said identified next data channel segment, and then retransmitting said virtual connection traversal message along each said identified control channel to the control processor of another node along said virtual connection.

9. The method of claim 8, said data portion of said virtual connection traversal message including a command;

said step (C) including, at each of said control processors in said sequence of nodes, executing said command in said received virtual connection traversal message.

10. The method of claim 8, including storing in each of said control processors in said nodes along said virtual connection, virtual connection data linking a first data channel segment in said tree of data channel segments with one or more second data channel segments in said tree of data channel segments; and said step (C) including, at each of said control processors in said sequence of nodes, prior to retransmitting said virtual connection traversal message, (C1) accessing said stored virtual connection data to identify each data channel segment linked to the data channel segment identified in the data portion of said received virtual connection traversal message, (C2) for each identified linked data channel segment, modifying said data portion of said virtual connection traversal message so as to include data that identifies said linked data channel segment, and (C3) for each identified linked data channel segment, identifying a control channel that is topologically parallel to said identified linked data channel segment;

said step C further including retransmitting said virtual connection traversal message over each said control channel identified in step C3.

11. The method of claim 8, wherein said data channel segment identified in said data portion of said virtual connection traversal message is represented in said data portion by an input label associated with an input link of the node that receives said virtual connection traversal message;

said tree of nodes to which said virtual connection traversal message is transmitted in step B follows, in order, nodes traversed by messages transmitted over said one virtual connection.

12. The method of claim 11, including storing in each of said control processors in said nodes along said virtual connection, virtual connection data linking input labels, each associated with a data channel segment on an input link of said each node, with output labels, each associated with another data channel segment on an output link of said each node;

said step (A) including storing said associated input label in said data portion of said virtual connection traversal message; and said step (C) including, at each of said control processors in said sequence of nodes, prior to retransmitting said virtual connection traversal message, (C1) accessing said stored virtual connection data to identify each data channel segment linked to the data channel segment associated with the input link representing in the data portion of said received virtual connection traversal message, (C2) for each identified linked data channel segment, modifying said data portion of said virtual connection traversal message so as to include an output label associated with said linked data channel segment, and (C3) for each identified linked data channel segment, identifying a control channel that is topologically parallel to said identified linked data channel segment;

said step C further including retransmitting said virtual connection traversal message over said control channel identified in step C3.

13. The method of claim 8, wherein said data channel segment identified in said data portion of said virtual connection traversal message is represented in said data portion by a output label associated with an output link of the node that receives said virtual connection traversal message;

said tree of nodes to which said virtual connection traversal message is transmitted in step B follows, in reverse order, nodes traversed by messages transmitted over said one virtual connection.

14. The method of claim 13, including storing in each of said control processors in said nodes along said virtual connection, virtual connection data linking input labels, each associated with a data channel segment on an input link of said each node, with output labels, each associated with another data channel segment on an output link of said each node;

said step (A) including storing said associated output label in said data portion of said virtual connection traversal message; and said step (C) including, at each of said control processors in said sequence of nodes, prior to retransmitting said virtual connection traversal message, (C1) accessing said stored virtual connection data to identify each data channel segment linked to the data channel segment associated with the output link representing in the data portion of said received virtual connection traversal message, (C2) for each identified linked data channel segment, modifying said data portion of said virtual connection traversal message so as to include an input label associated with said linked data channel segment, and (C3) for each identified linked data channel segment, identifying a control channel that is topologically parallel to said identified linked data channel segment;

said step C further including retransmitting said virtual connection traversal message over said control channel identified in step C3.

15. A method of sending messages in a switch based label swapping communication network of hosts and communication nodes, where each said communication node is connected to at least one other of said communication nodes by input links and output links and each of said hosts are attached to at least one of said communication nodes by input links and output links;

each said communication node further including a switching apparatus that, when it receives a digital message at one of its input links, sends the message over a programmable set of its output links selected in accordance with said one input link's identity and an input label contained in the received message, and prior to sending said message over each output line in said set of output links, replaces said input label in said received message with a programmable output label selected in accordance with said one input link's identity, said input label and the identity of the output link on which the message is being sent;

said network including at least one a unicast virtual connection between two hosts coupled to two distinct ones of said nodes in said network, said virtual connection including a sequence of data channel segments on a plurality of said links that interconnect a plurality of said nodes in said network;

said method comprising the steps of:

(A) at the control processor of one of said nodes, generating a virtual connection traversal message that includes (1) a message header having an input label that identifies a first control channel connecting said control processor to the control processor another one of said nodes, and (2) a data portion that identifies a data channel segment in one of said virtual connections;

(B) transmitting said virtual connection traversal message over a sequence of control channels to the control processors at a sequence of nodes along said virtual connection, wherein each of said control channels is topologically parallel to one of the data channel segments in said one virtual connection; and (C) at each of said control processors in said sequence of nodes, receiving said virtual connection traversal message, parsing said data portion of said virtual connection traversal message to identify a next data channel segment, if any, along said virtual connection and to identify a control channel topologically parallel to said identified next data channel segment, and then retransmitting said virtual connection traversal message along said identified control channel to the control processor of another node along said virtual connection.

16. The method of claim 15, said data portion of said virtual connection traversal message including a command;

said step C including, at each of said control processors in said sequence of nodes, executing said command in said received virtual connection traversal message.

17. The method of claim 15, including storing in each of said control processors in said nodes along said virtual connection virtual connection data linking a first data channel segment in said sequence of data channel segments with a second data channel segment in said sequence of data channel segments; and said step (C) including, at each of said control processors in said sequence of nodes, prior to retransmitting said virtual connection traversal message, (C1) accessing said stored virtual connection data to identify the data channel segment linked to the data channel segment identified in the data portion of said received virtual connection traversal message, (C2) modifying said data portion of said virtual connection traversal message so as to include data that identifies said linked data channel segment, and (C3) identifying a control channel that is topologically parallel to said identified linked data channel segment;

said step C further including retransmitting said virtual connection traversal message over said control channel identified in step C3.

18. The method of claim 15, wherein said data channel segment identified in said data portion of said virtual connection traversal message is represented in said data portion by an input label associated with an input link of the node that receives said virtual connection traversal message;

said sequence of nodes to which said virtual connection traversal message is transmitted in step B follows, in order, nodes traversed by messages transmitted over said one virtual connection.

19. The method of claim 18, including storing in each of said control processors in said nodes along said virtual connection, virtual connection data linking input labels, each associated with a data channel segment on an input link of said each node, with output labels, each associated with another data channel segment on an output link of said each node;

said step (A) including storing said associated input label in said data portion of said virtual connection traversal message; and said step (C) including, at each of said control processors in said sequence of nodes, prior to retransmitting said virtual connection traversal message, (C1) accessing said stored virtual connection data to identify the data channel segment linked to the data channel segment associated with the input link representing in the data portion of said received virtual connection traversal message, (C2) modifying said data portion of said virtual connection traversal message so as to include an output label associated with said linked data channel segment, and (C3) identifying a control channel that is topologically parallel to said identified linked data channel segment;

said step C further including retransmitting said virtual connection traversal message over said control channel identified in step C3.

20. The method of claim 15, wherein said data channel segment identified in said data portion of said virtual connection traversal message is represented in said data portion by a output label associated with an output link of the node that receives said virtual connection traversal message;

said sequence of nodes to which said virtual connection traversal message is transmitted in step B follows, in reverse order, nodes traversed by messages transmitted over said one virtual connection.

21. The method of claim 20, including storing in each of said control processors in said nodes along said virtual connection, virtual connection data linking input labels, each associated with a data channel segment on an input link of said each node, with output labels, each associated with another data channel segment on an output link of said each node;

said step (A) including storing said associated output label in said data portion of said virtual connection traversal message; and said step (C) including, at each of said control processors in said sequence of nodes, prior to retransmitting said virtual connection traversal message, (C1) accessing said stored virtual connection data to identify the data channel segment linked to the data channel segment associated with the output link representing in the data portion of said received virtual connection traversal message, (C2) modifying said data portion of said virtual connection traversal message so as to include an input label associated with said linked data channel segment, and (C3) identifying a control channel that is topologically parallel to said identified linked data channel segment;

said step C further including retransmitting said virtual connection traversal message over said control channel identified in step C3.

* * * * *